US006442439B1

(12) United States Patent
Robinett, III et al.

(10) Patent No.: US 6,442,439 B1
(45) Date of Patent: Aug. 27, 2002

(54) PENDULATION CONTROL SYSTEM AND METHOD FOR ROTARY BOOM CRANES

(75) Inventors: Rush D. Robinett, III, Tijeras; Kenneth N. Groom; John T. Feddema, both of Albuquerque, all of NM (US); Gordon G. Parker, Houghton, MI (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/339,787

(22) Filed: Jun. 24, 1999

(51) Int. Cl.[7] .......................... G05B 13/02; B66C 13/06
(52) U.S. Cl. ......................... 700/55; 212/273; 212/199; 212/245; 212/249; 212/260; 212/263; 701/50
(58) Field of Search ................................ 212/275, 270, 212/273; 901/17; 700/17, 19–20, 35, 55, 63, 69, 85, 160, 188, 262, 54; 701/50; 37/394–397; 414/543

(56) References Cited

U.S. PATENT DOCUMENTS

| | | | | |
|---|---|---|---|---|
| 4,547,857 A | * 10/1985 | Alexander | .................. | 364/505 |
| 5,550,733 A | * 8/1996 | Yun et al. | .................... | 364/174 |
| 5,731,987 A | * 3/1998 | Strong et al. | ............... | 364/505 |
| 5,785,191 A | 7/1998 | Feddema et al. | ........... | 212/275 |
| 5,908,122 A | * 6/1999 | Robinett et al. | ............ | 212/275 |
| 5,961,563 A | * 10/1999 | Overton | ........................ | 701/50 |
| 6,039,193 A | * 3/2000 | Naud et al. | ................. | 212/270 |

FOREIGN PATENT DOCUMENTS

FR 2704847 A1 * 11/1994 ........... B66C/13/06

OTHER PUBLICATIONS

Parker et al., "Experimental Verification of a Command Shaping Boom Crane Control System," Proceedings of the American Control Conference, pp. 86–90, 1999.*

Lewis et al., "Command Shaping Control of an Operator–in–the–Loop Boom Crane," Proceedings of the American Control Conference, pp. 2643–2647, 1998.*

Parker et al. "Operator in–the–loop Control of Rotary Cranes," Proceedings of the SPIE Symposium on Smart Structures and Materials, Industrial Applications of Smart Structures Technologies, San Diego, CA, vol. 2721, pp. 364–372, Feb. 27–29, 1996, hereafter referred to as Parker'96.

Vaha et al., "Robotization of an Offshore Container Crane," Robots: Coming of Age, Proceedings of the 19th ISIR International Symposium, pp. 637–648, 1988.

Sakawa and Nakazumi, "Modeling and Control of a Rotary Crane," Journal of Dynamic Systems, Measurement, and Control, vol. 107, pp. 200–206, 1985.

Ott, "Control of Container cranes," Proceedings of the National Conference on Noise Control Engineering, vol. 1, No. 1, pp. 407–410, 1996.

(List continued on next page.)

*Primary Examiner*—Thomas Black
*Assistant Examiner*—Crystal J Barnes
(74) *Attorney, Agent, or Firm*—Suzanne L. K. Rountree

(57) ABSTRACT

A command shaping control system and method for rotary boom cranes provides a way to reduce payload pendulation caused by real-time input signals, from either operator command or automated crane maneuvers. The method can take input commands and can apply a command shaping filter to reduce contributors to payload pendulation due to rotation, elevation, and hoisting movements in order to control crane response and reduce tangential and radial payload pendulation. A filter can be applied to a pendulation excitation frequency to reduce residual radial pendulation and tangential pendulation amplitudes.

22 Claims, 6 Drawing Sheets

OTHER PUBLICATIONS

Lewis et al., "Command Shaping Control of a Operator–in–the–Loop Boom Crane," Proceedings of the 1998 American Control Conference, Jun. 24–26, 1998.

Parker et al., "Experimental Verification of a Command Shaping Boom Crane Control System," American Controls Conference 1999, Jun. 2, San Diego, 1999, hereafter referred to as Parker'99.

Groom et al., "Swing–Free Cranes via Input Shaping of Operator Commands," ISARC, Madrid, Spain, Sep. 22, 1999.

Derek A. Lewis, "Sway suppression for Operator Induced Disturbances in a Rotary Boom Crane," a Thesis submitted in partial fulfillment of the requirements for the degree of Master of Science in Mechanical Engineering, Michigan Technological University, 1998.

* cited by examiner

PENDULATION CONTROL SYSTEM AND METHOD FOR ROTARY BOOM CRANES

This invention was made with Government support under Contract DE-AC04-94AL85000 awarded by the U.S. Department of Energy. The Government has certain rights in the invention.

BACKGROUND OF THE INVENTION

This invention relates to the field of cranes and more particularly to control systems and methods for controlling residual pendulation associated with the movement of suspended payloads using rotary boom cranes.

One category of construction and transportation cranes consists of overhead gantry cranes. A second category of construction and transportation cranes consists of rotary cranes, of which there are two types: rotary jib cranes and rotary boom cranes.

Components of crane commands can induce sway of a payload. Sway control depends on the particular category of crane and its structural configuration.

Rotary Boom Cranes

A rotary boom crane configuration has a crane column horizontally rotatable about a vertical axis, a luffing boom attached to the column, and a pendulum-like hoist-line attached to the distal end of the boom. A rotary boom crane can have one translation degree of freedom (variable hoist-line length) and two rotation degrees of freedom: rotation about the crane column (slewing) and boom elevation through a vertical angle (luffing). Positioning of a payload that swings from the hoist-line is accomplished through luff, slew, and hoist commands. Because of differences in translational and rotational degrees of freedom between a rotary boom crane and a rotary jib crane, primarily due to the luffing boom, a rotary boom crane configuration has different payload dynamics and can require a different control system.

Cranes are used in virtually any large-scale construction or cargo transportation operation. In a typical construction or transportation crane maneuver, an operator uses translation, rotation, and lifting operations to move a container. Maneuvers are performed at rates sufficiently slow in order to reduce unwanted container pendulation. Unfortunately, slow crane maneuvers can increase the cost and time involved to move cargo. The operational approach to reduce payload residual pendulation is to reduce crane velocities and accelerations.

Overhead Gantry Cranes

Sway control has been disclosed for overhead gantry cranes. An overhead gantry crane incorporates a trolley which can translate in two directions in a horizontal plane. Attached to the trolley is a load-line for payload attachment, which can have varying load-line length.

Feddema et al., U.S. Pat. No. 5,785,191 (1998), is an example of operator control systems and methods for swing-free motion in gantry-style cranes. Feddema et al. discloses use of an infinite impulse response filter and a proportional-integral feedback controller to dampen payload sway in a crane having a trolley moveable in a horizontal plane and having a payload suspended by multiple variable-length cables for payload movement in a vertical plane.

Overhead gantry cranes are suitable for construction and transportation applications where the physical environment supports the crane's required overhead structure. Overhead gantry cranes can have three translational degrees of freedom, two directions of trolley translation and one vertical translation of load-line length (for example, left-right, forward-backward, and up-down translations). Overhead gantry cranes have no rotation about an axis. Consequently, Feddema's control system is limited to overhead gantry cranes and cannot work for cranes with different types of degrees of freedom, such as rotation about an axis as found in rotary cranes.

Rotary Jib Cranes

Sway control has been disclosed for rotary jib cranes. Rotary jib cranes have three degrees of freedom. The first is a rotation about a vertical axis at a crane base. The second is a horizontal translation of a trolley along a fixed-elevation jib, as in a gantry crane. The third is a variable load-line length, also a translation. When a payload is disturbed, the payload and load-line move like a spherical pendulum about the load-line to trolley attachment point. Robineff et al., U.S. Pat. No. 5,908,122 (1999), is an example of a sway control method and system for rotary jib cranes.

Oscillation control for a rotary jib crane configuration can account for one rotational axis (the jib) and two translational axes (trolley position along the jib and load-line length). See Parker et aL, "Operator in-the-loop Control of Rotary Cranes," Proceedings of the SPIE Symposium on Smart Structures and Materials, Industrial Applications of Smart Structures Technologies, San Diego, Calif., Vol. 2721, pp. 364–372, Feb. 27–29, 1996, hereafter referred to as Parker'96. Parker'96 teaches an open-loop control method for reducing the oscillatory motion of rotary jib crane payloads during operator commanded maneuvers. The control method of Parker'96 works only for a rotary jib crane with three controllable motions: jib rotation in a horizontal plane about a vertical axis, trolley translation along a jib axis, and translational load-line length changes. The controllable motions result in two unactuated tangential and radial pendulation motions of the load-line and payload. Since the jib is fixed in a horizontal plane, payload elevation changes are only accomplished through changes in the load-line length. Consequently, Parker'96's control system is limited to cranes with only one rotational axis (the jib) and two translational axes (trolley position along the jib and load-line length), and cannot work for cranes with different types of degrees of freedom as found in rotary boom cranes.

Payload Motion in a Rotarty Boom Crane

A payload moved by a rotary boom crane can have two oscillatory degrees of freedom. The first is payload pendulation tangential to an arc traced by the distal end of the boom while slewing the crane (or equivalently, a motion tangential to the column axis of rotation). The second is a payload pendulation radial to the column axis of rotation. Both radial and tangential pendulation have zero value when the hoist-line is parallel to a gravitational vector. At the end of a typical point-to-point maneuver, the payload will oscillate in these two directions. The degree of oscillation is dependent on the specific maneuver. Currently, an operator's only option for mitigation of residual pendulation is to maneuver the payload slowly, contributing to higher construction and transportation costs.

Crane Control Systems

One class of crane control systems proposes to increase potential maneuver speed by controlling residual pendulation. One approach, command shaping, is an open loop approach for generating a maneuver which will not excite residual pendulation. A number of techniques for open-loop pendulation control crane operations have been developed. See, for example, Vaha et al., "Robotization of an Offshore Container Crane," Robots: Coming of Age, Proceedings of the $19^{th}$ ISIR International Symposium, pp. 637–648, 1988.

However, Vaha's approach does not compensate for radial pendulation, due to centripetal acceleration of a payload.

Sakawa and Nakazumi propose an open-loop plus closed-loop feedback control for automatic operation of a rotary crane which makes three kinds of motion (rotation, load hoisting, and boom hoisting) simultaneously. See Sakawa and Nakazumi, "Modeling and Control of a Rotary Crane," Journal of Dynamic Systems, Measurement, and Control, Vol. 107, pp. 200–206, 1985. Sakawa and Nakazumi propose control for automated rotary crane operation, but do not address rotary boom crane operation with an operator-in-the-loop.

A proposed rotary boom crane control system relies on modifications to a nominal crane system. See Ott, "Control of Container cranes," Proceedings of the National Conference on Noise Control Engineering, Vol. 1, No. 1, pp. 407–410, 1996. Ott's system could work for newly designed cranes, but Ott requires crane modification and does not work well with existing cranes.

Accordingly, there is an unmet need for reducing payload pendulation in rotary boom cranes—having luff, slew, and hoist velocities—with an operator-in-the-loop. Such cranes typically can be found in construction and ship-based applications.

SUMMARY OF THE INVENTION

This invention provides a new control system for filtering input commands to a rotary boom crane to reduce payload pendulation, using a command shaping filter to remove an identified payload pendulation frequency.

The present invention provides a new method for controlling rotary boom cranes. The present invention filters rotary boom crane operator input commands to reduce unwanted residual pendulation. The present invention implements command shaping filters, designed through the use of rotary boom crane kinematics and payload equations of motion. The present invention uses the filters to generate filtered signals to crane servo controllers, resulting in payload motion with minimal pendulation.

The present invention provides a command shaping control method for reducing payload pendulation caused by operator commanded maneuvers, in rotary boom cranes, such as those found in construction and cargo transportation.

BRIEF DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a new control system for filtering input commands to a rotary boom crane to reduce residual pendulation of the payload after a point-to-point maneuver, using a command shaping filter to remove an identified payload pendulation frequency.

Crane Description

Figure 1:
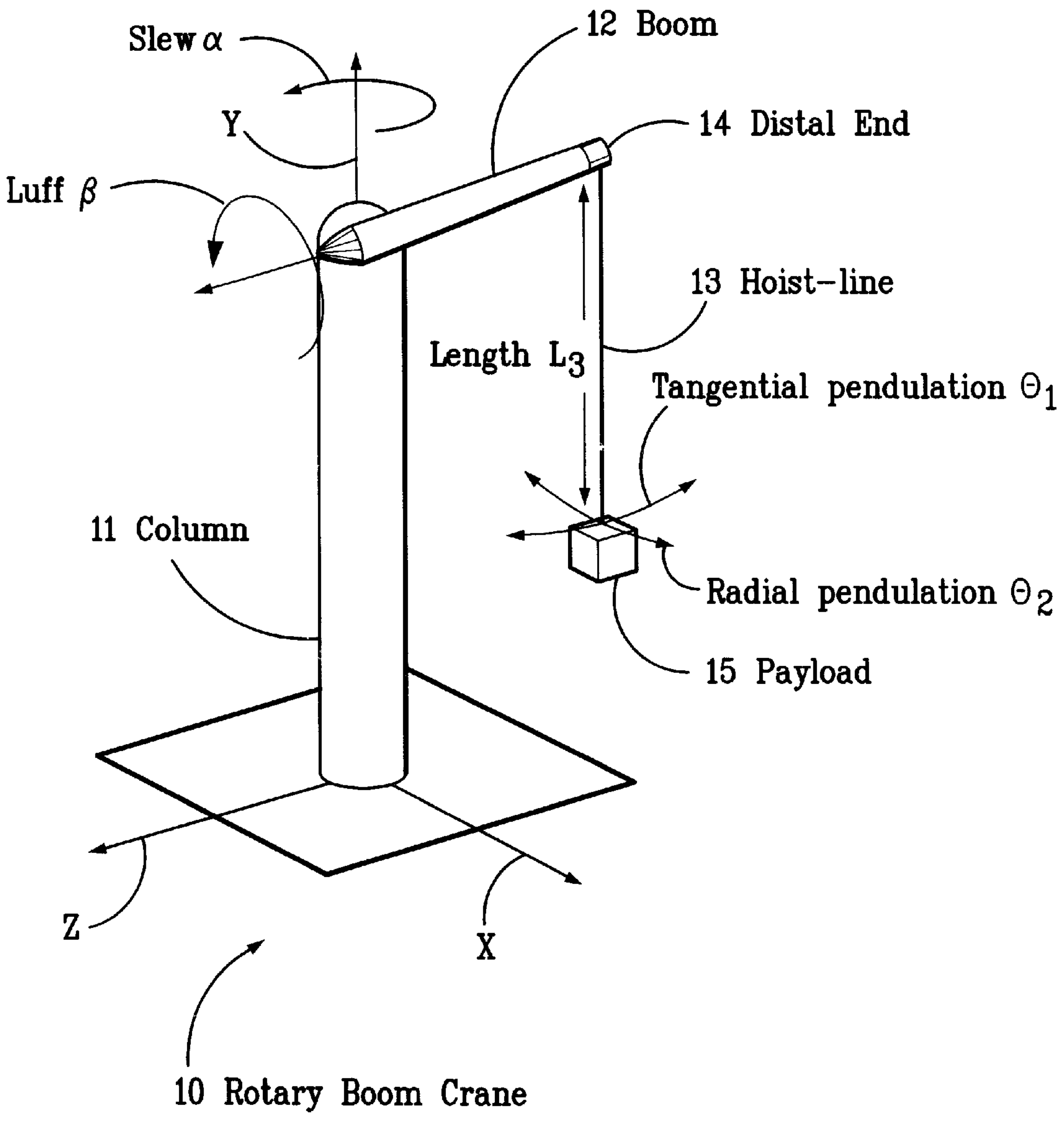
FIG. 1 is a diagram of a rotary boom crane utilizing the control system of the present invention.

FIG. 1 depicts an embodiment of a rotary boom crane 10 made up of a crane column 11 horizontally rotatable about vertical axis Y through a slew angle $\alpha$, a luffing boom 12 attached to crane column 11 and rotatable through a luff angle $\beta$, and a variable-length hoist-line 13 attached to tip 14 of luffing boom 12. Those skilled in the art appreciate other rotary boom crane embodiments suitable for use with the present invention.

A crane configuration has a payload mass 15 that swings like a spherical pendulum on the end of hoist-line 13, through a tangential rotation angle $\theta_1$ and a radial rotation angle $\theta_2$, to be maintained substantially parallel relative to a gravitational vector for minimal pendulation. Hoist-line 13 has length $L_3$. A natural frequency of payload pendulation can be estimated by:

$$\omega_i = \sqrt{\frac{g}{L_3}},$$

where g is gravitational acceleration 32.2 ft/sec$^2$. The tangential rotation angle $\theta_1$ and the radial rotation angle $\theta_2$ describe measured pendulation resulting from residual payload pendulation frequency.

This type of crane is used in construction and transportation applications. Positioning of the payload is accomplished through the crane column and boom angles and changes in the hoist-line length, implemented through slew, luff, and hoist commands issued in real-time by a crane operator. Since the configuration of the crane affects the excitation and response of the payload, a pendulation or swing control scheme, must account for the varying geometry of the system. The present invention provides a command shaping pendulation control system to reduce the pendulum mode of the hoist-line excited by operator disturbances and to aid the crane operator in positioning and control of the payload. Adaptive forward path command filters are employed to remove components of the input commands which induce oscillation of the hoist-line (payload swing), allowing near residual pendulation free payload repositioning.

Crane Control Process

Figure 2:
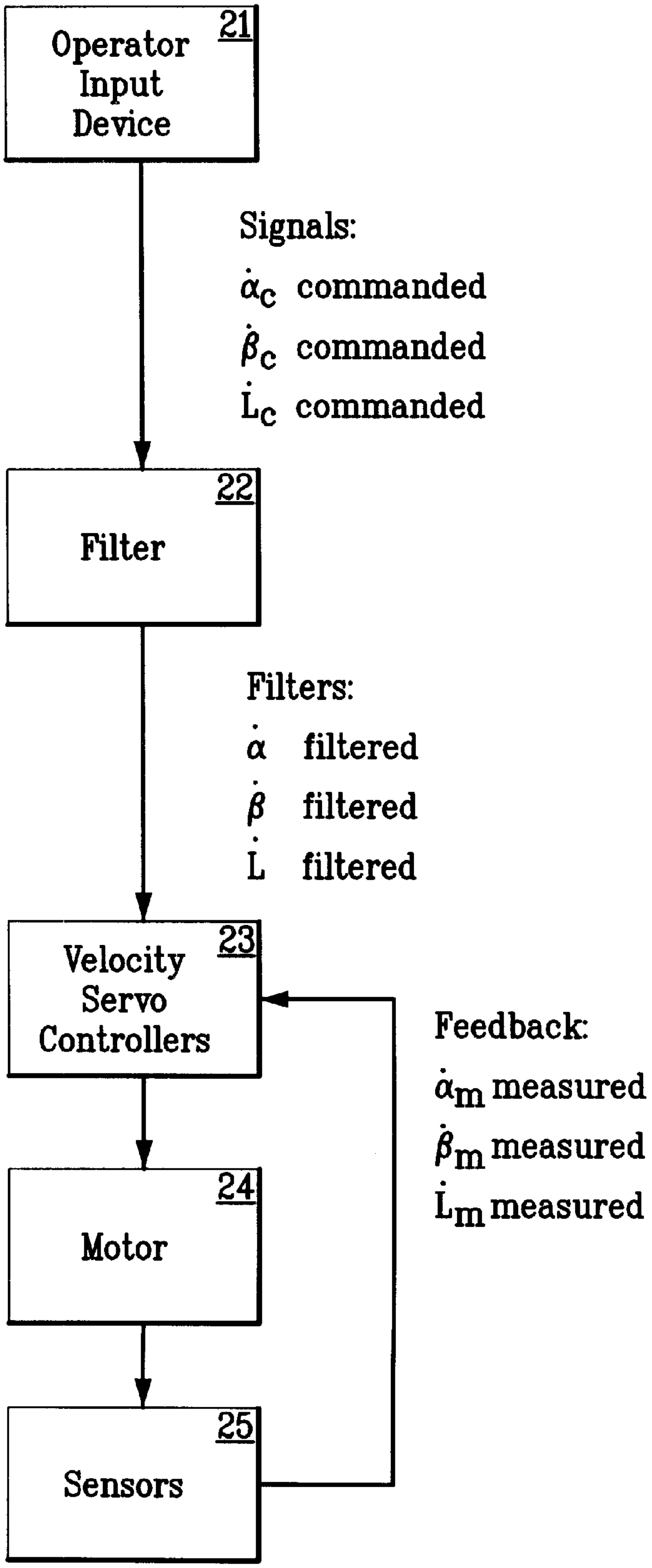
FIG. 2 depicts a rotary boom crane control process, according to the present invention.

FIG. 2 depicts a rotary boom crane control process according to the present invention. A crane operator uses operator input devices 21 to issue commands such as commanded luff velocity, commanded slew angular velocity, and commanded hoist velocity, to control a rotary boom crane. As an example, a typical operator input device 21 can comprise a hand-control device such as an analog joystick, a button box, or a lever-driven device; a foot-operated pedal; or a computer-driven device. One embodiment implemented has two analog joysticks: one controlling luff and slew, and the other controlling hoist.

The operator commands can be interpreted as signals by a sensor and input to a computer, where a computer-implemented command shaping filter 22 can be applied. One embodiment interpreted operator commands as electrical signals. Filter 22 outputs filtered commands: filtered luff velocity, filtered slew angular velocity, and filtered hoist velocity. Filter 22 can be designed though the use of crane and payload equations of motion to remove payload pendulation frequency.

The filtered commands can be input to a set of crane velocity servo controllers 23. For example, each servo controller can control torque for one of three motors 24 for the crane's motions: luff, slew, and hoist. Sensors 25 can measure the resulting luff, slew, and hoist, and feed the measured values back to velocity servo controllers 23 for closed loop adjustments.

Filter Design Process

Figure 3:
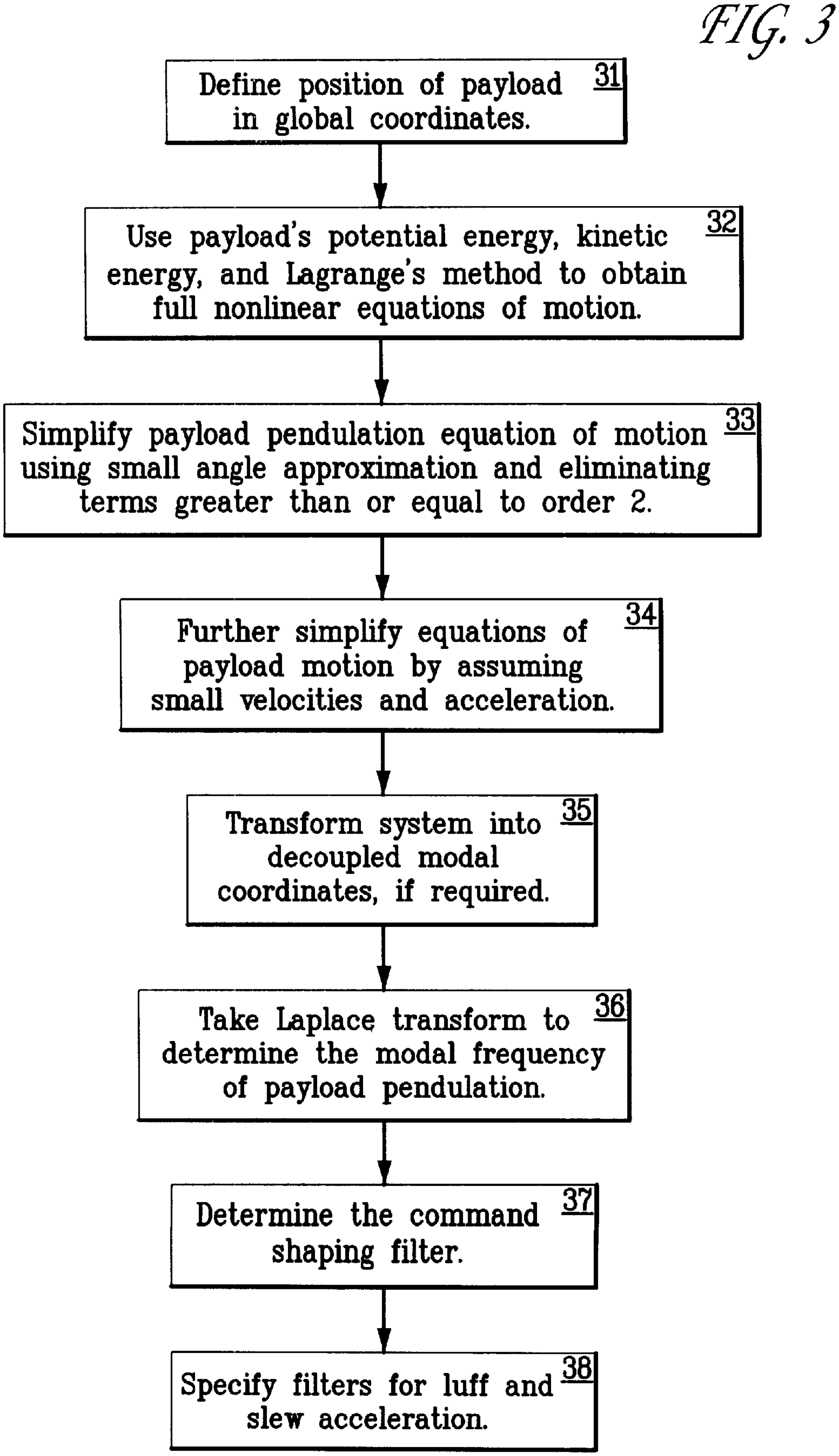
FIG. 3 is an example of a method of filtering pendulation frequency as in the command shaping method of the present invention.

FIG. 3 is an example of a method of filtering pendulation frequency as in a command shaping method of the present invention to reduce payload pendulation in a rotary boom crane.

The first step in the method is to define the position of the payload in global coordinates, step 31.

Next, use the payload potential energy equation, the payload kinetic energy equation, and Lagrange's method to obtain full nonlinear equations of motion for payload motion—tangential pendulation and radial pendulation—resulting from luff, slew, and hoist inputs in a rotary boom crane, step 32. Define payload motion in terms of crane dynamics: hoist velocity, luff velocity, and slew angular velocity. The payload can be treated as a concentrated mass (m) with no dynamics of its own.

Simplify the equations of motion of the payload pendulation by using small angle approximation and eliminating all nonlinear terms of order two or higher, step 33, to get:

$$\ddot{\theta}_1 + \frac{2\dot{L}_3}{L_3}\dot{\theta}_1 + 2\dot{\alpha}\dot{\theta}_2 + \left(-\dot{\alpha}^2 - \frac{L_2\sin(\beta)\dot{\beta}^2}{L_3} + \frac{L_2\cos(\beta)\ddot{\beta}}{L_3} + \frac{g}{L_3}\right)\theta_1 + \left(\ddot{\alpha} + \frac{2\dot{\alpha}\dot{L}_3}{L_3}\right)\theta_2 = \frac{-L_2\cos(\beta)\ddot{\alpha}}{L_3} + \frac{2L_2\sin(\beta)\dot{\alpha}\dot{\beta}}{L_3} \quad \text{and} \qquad \text{(equation 1)}$$

$$\ddot{\theta}_2 + \frac{2\dot{L}_3}{L_3}\dot{\theta}_2 - 2\dot{\alpha}\dot{\theta}_1 + \left(-\dot{\alpha}^2 - \frac{L_2\sin(\beta)\dot{\beta}^2}{L_3} + \frac{L_2\cos(\beta)\ddot{\beta}}{L_3} + \frac{g}{L_3}\right)\theta_2 + \left(-\ddot{\alpha} - \frac{2\dot{\alpha}\dot{L}_3}{L_3}\right)\theta_1 = \frac{L_2\cos(\beta)\dot{\alpha}^2}{L_3} + \frac{L_2\cos(\beta)\dot{\beta}^2}{L_3} + \frac{L_2\sin(\beta)\ddot{\beta}}{L_3}, \qquad \text{(equation 2)}$$

where $L_3$ is the hoist-line length, β is gravity, α is the luff angle, α is the slew angle, $\theta_1$ is the tangential rotation angle, and $\theta_2$ is the radial rotation angle.

Further simplify the linearized dynamics of the crane model by assuming small velocities and accelerations for slew and luff, to reduce the equations of payload motion, step 34, down to:

$$\begin{bmatrix} 1 & 0 \\ 0 & 1 \end{bmatrix}\begin{bmatrix} \ddot{\theta}_1 \\ \ddot{\theta}_2 \end{bmatrix} + \begin{bmatrix} \frac{g}{L_3} & 0 \\ 0 & \frac{g}{L_3} \end{bmatrix}\begin{bmatrix} \theta_1 \\ \theta_2 \end{bmatrix} = \begin{bmatrix} \frac{-\cos(\beta)L_2\ddot{\alpha}}{L_3} \\ \frac{L_2\ddot{\beta}\sin(\beta)}{L_3} \end{bmatrix}, \qquad \text{(equation 3)}$$

where $L_3$ is the hoist-line length, g is gravity, β is the luff angle, α is the slew angle, $\theta_1$ is the tangential rotation angle, and $\theta_2$ is the radial rotation angle. The equations in matrix equation 3 are dynamically decoupled. The pendulation excitation is through nonlinear combinations of the slew, luff, and hoist states.

Whenever the system states are coupled, the simplified model is then transformed into decoupled modal coordinates, step 35. An eigenproblem can be solved to obtain eigenvalues $\omega_i^2$.

In an example embodiment discussed below, the system states given in equation 3 already are decoupled equations in $\theta_1$ and $\theta_2$. If the system states were coupled, a transformation into decoupled modal coordinates could be performed as described in Lewis et aL., "Command Shaping Control of a Operator-in-the-Loop Boom Crane," Proceedings of the 1998 American Control Conference, Jun. 24–26, 1998, incorporated herein by reference.

Taking the Laplace transform, step 36, yields a transfer function of the outputs over the inputs, and gives:

$$\frac{y_i(s)}{U_i(s)} = \frac{1}{(s^2 + \omega_i^2)}, \qquad \text{(equation 4)}$$

where s denotes a Laplace transformation variable, $U_i$ denotes the resulting crane inputs to the crane's speed servo controllers, $\omega_i$ denotes a pendulation frequency, and $y_i$ is a function of the pendulation angle $\theta_i$. In this example embodiment, $y_i = \theta_i$.

Determine the command shaping filter, step 37, which in this example takes the form:

$$U_i(s) = \frac{a^3(s^2 + \omega_i^2)}{\omega_i^2(s + a)^3}U_i^c(s), \qquad \text{(equation 5)}$$

where $U_i^c$ denotes the operator's commanded modal space input for both the luff and slew rates, s denotes a Laplace transformation variable, $U_i$ denotes the resulting crane inputs to the crane's speed servo controllers, $\omega_i$ denotes a pendulation frequency, and α denotes a design parameter. The filter numerator in equation 5 is designed to notch out the modal frequency, while the filter constants can be chosen to give unity steady state gain to the filter. In this example, $\hat{\alpha}$ is chosen to be 2.0.

Figure 4:
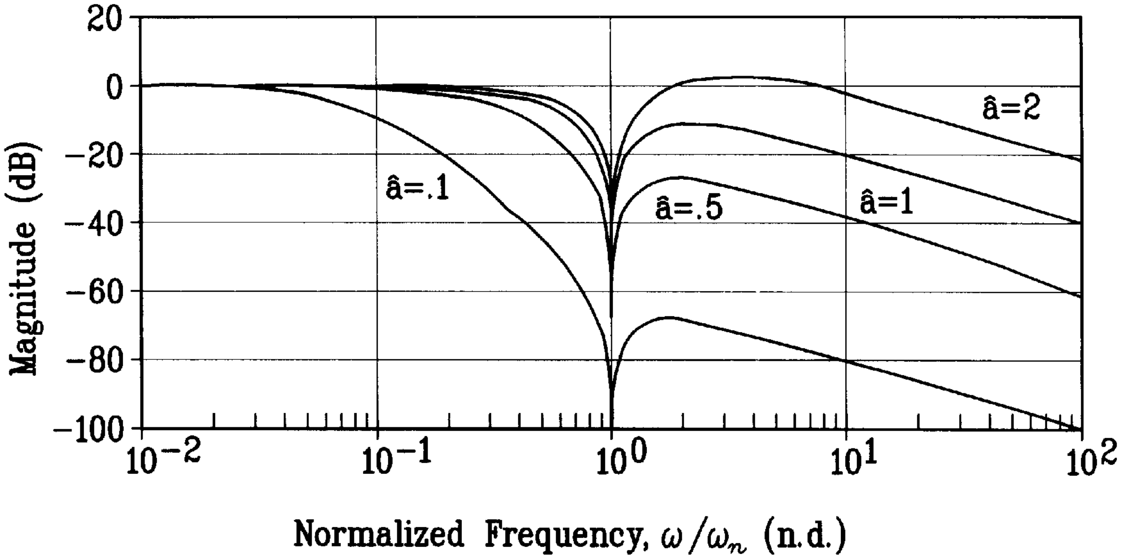
FIG. 4 depicts the effects of filter parameter $\hat{\alpha}$ on the roll-off characteristics of a command shaping filter, according to the present invention.

The pendulation frequency to be filtered, $\omega_i$, can change continuously according to changes in hoist-line length, $L_3$, where $\omega_i^2 = g/L_3$. In a physical implementation of the filter, the order of the denominator in equation 5, $\omega_i^2(s+\alpha)^3$, was equivalent to the order of the $\alpha^3(s^2+\omega_i^2)$ part of the numerator in equation 5. Parameter α determines the roll-off characteristics of the filter in the frequency domain and was chosen in this example using the nondimensionalized frequency response plots of the filter given in FIG. 4. Once $\hat{\alpha}$ has been chosen, then $\alpha = \hat{\alpha}\omega_n$. A notch filter, as used in this example embodiment, can be used to notch out the frequency which causes undesired pendulation in the payload. Those skilled in the art realize that other filter embodiments may be obtained using the method of the present invention.

The design for this example embodiment described by the equations of motion given in matrix equation 3, yields the following filters for luff and slew acceleration, step 38:

$$\ddot{\alpha}_{Filtered}(s) = \frac{a^3(g + L_3 s^2)}{g(a+s)^3}\ddot{\alpha}_{Commanded}(s) \text{ and} \qquad \text{(equation 6)}$$

$$\ddot{\beta}_{Filtered}(s) = \frac{a^3(g + L_3 s^2)}{g(a+s)^3}\ddot{\beta}_{Commanded}(s), \qquad \text{(equation 7)}$$

where $L_3$ denotes lift-line length, α denotes slew acceleration command (for both the operator input command and the filtered command to the crane), β denotes luff acceleration command, g denotes gravity constant, s denotes a Laplace transformation variable, and α denotes a design parameter.

Velocity servo controllers in conjunction with motors and encoders, as used in one embodiment, can be used to implement the filtered commands and the crane servo controllers.

Simulation

The full nonlinear equations of motion, from step 32 in the filter design process, were used in an operator-in-the-loop simulation using a digital open architecture control system such as the dSPACE platform, for testing of control strategy and filter design. Joysticks provided velocity inputs. See Lewis et at. Positions were numerically computed from the velocities. Simulated pendulation outputs from the crane models (filtered and unfiltered) were sent to a graphical user interface.

Experimental Verification

The command shaping strategy, comprising a time-varying filter, reduced payload oscillation in experiments using a 1/16$^{th}$ scale version of a Hagglunds Model TG3637 rotary boom crane having an 8 foot boom length. See Parker et al., "Experimental Verification of a Command Shaping Boom Crane Control System," American Controls Conference 1999, San Diego, Jun. 2, 1999, hereafter referred to as Parker'99, incorporated herein by reference.

Figure 5:
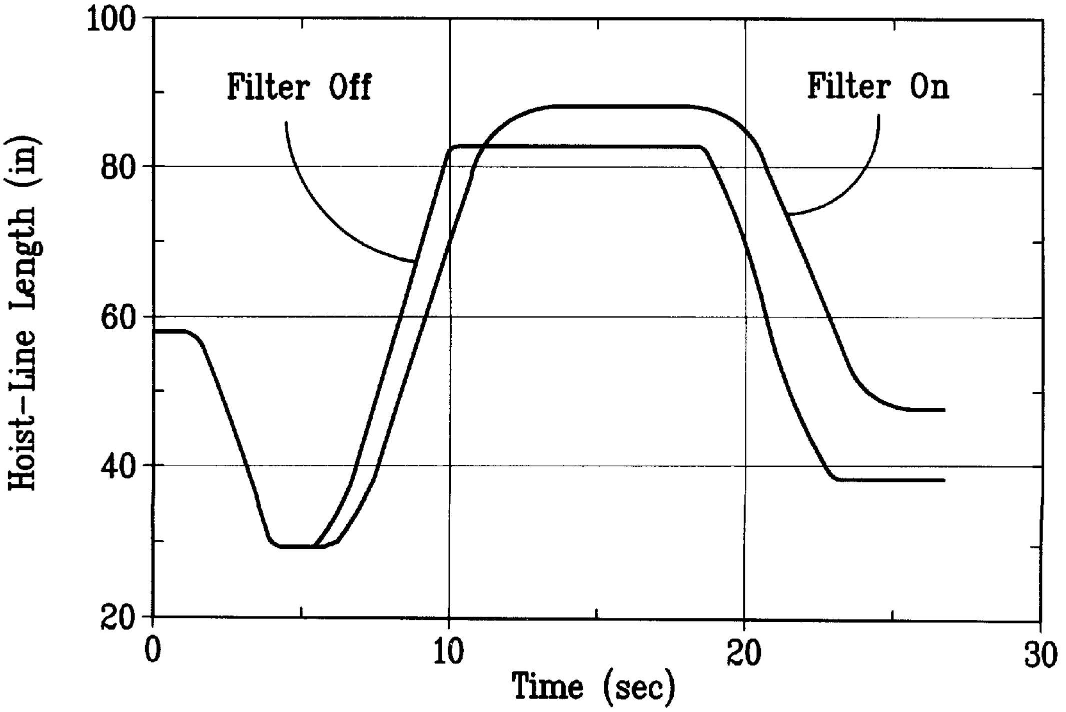
FIG. 5 depicts measured hoist for filtered and unfiltered maneuvers in a testbed experiment of the present invention.
Figure 6:
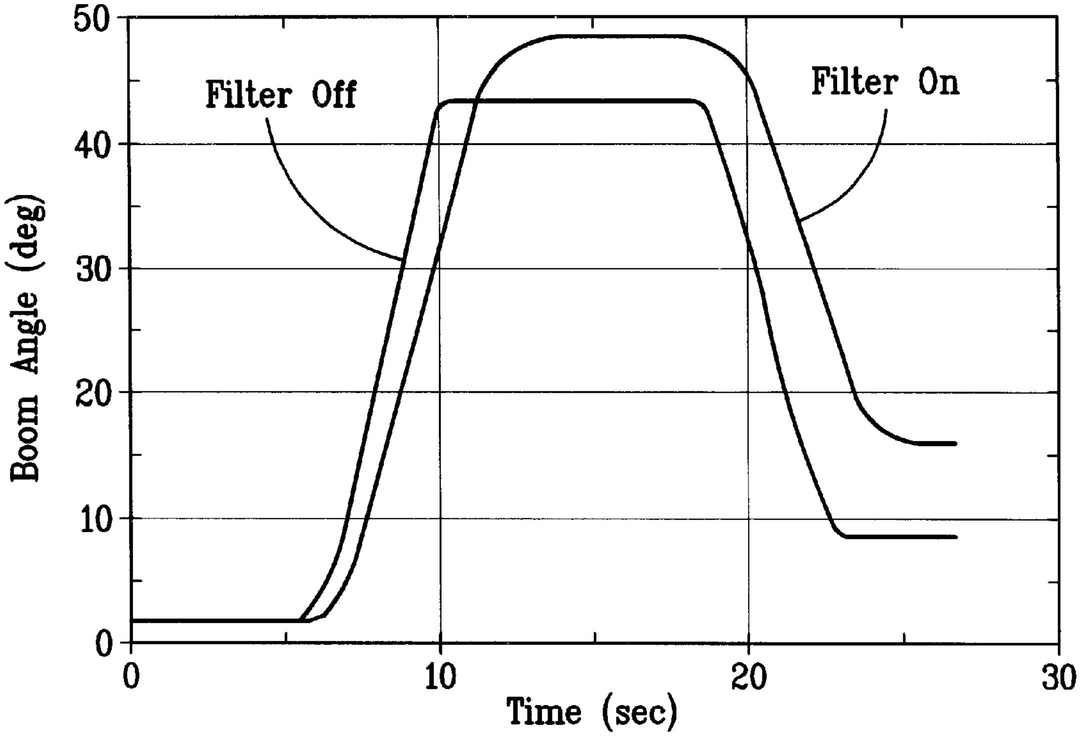
FIG. 6 depicts measured luff for filtered and unfiltered maneuvers in a testbed experiment of the present invention.
Figure 7:
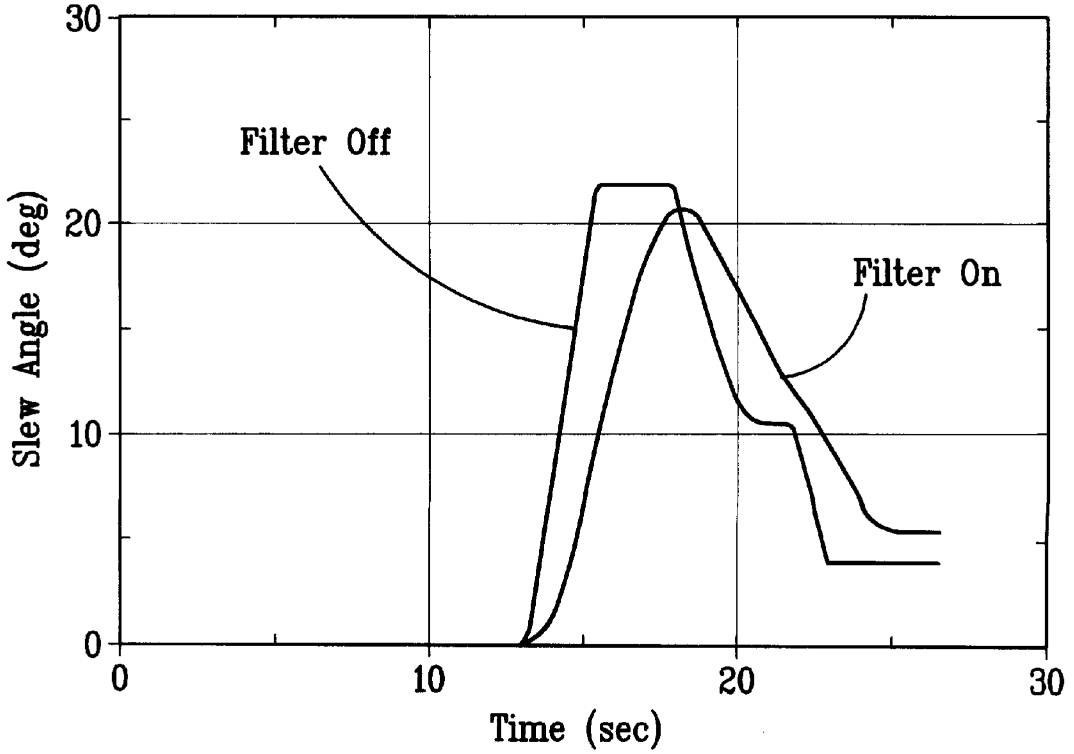
FIG. 7 depicts measured slew for filtered and unfiltered maneuvers in a testbed experiment of the present invention.
Figure 8:
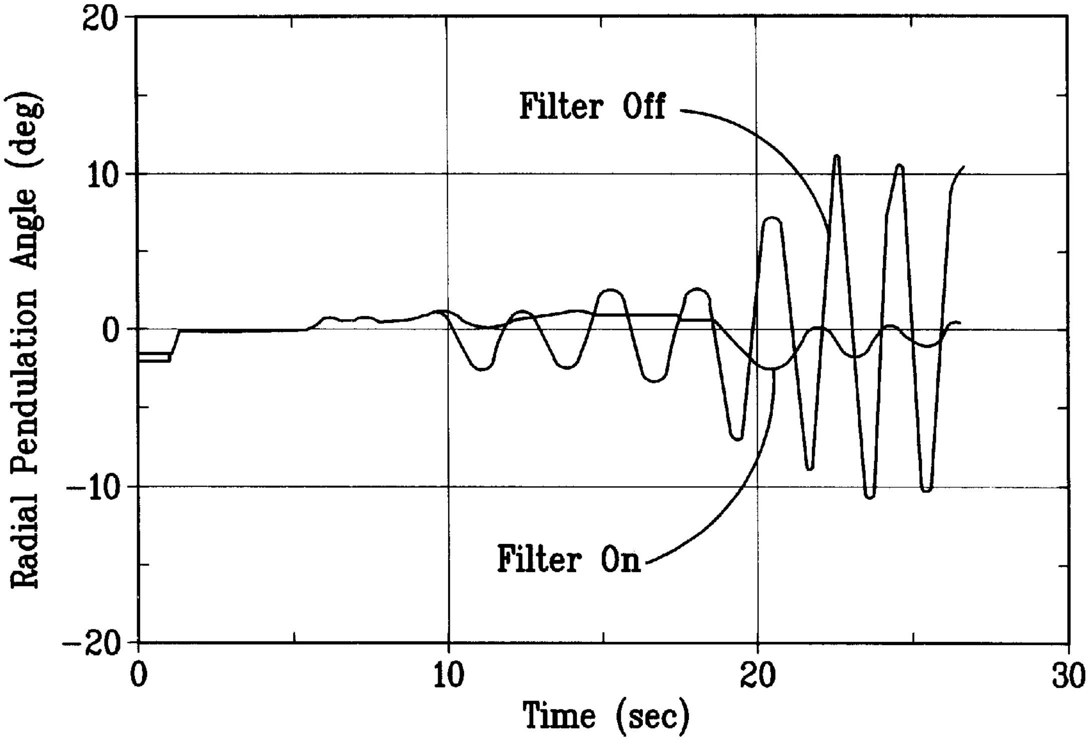
FIG. 8 depicts measured radial pendulation $\theta_2$ for filtered and unfiltered maneuvers in a testbed experiment of the present invention.
Figure 9:
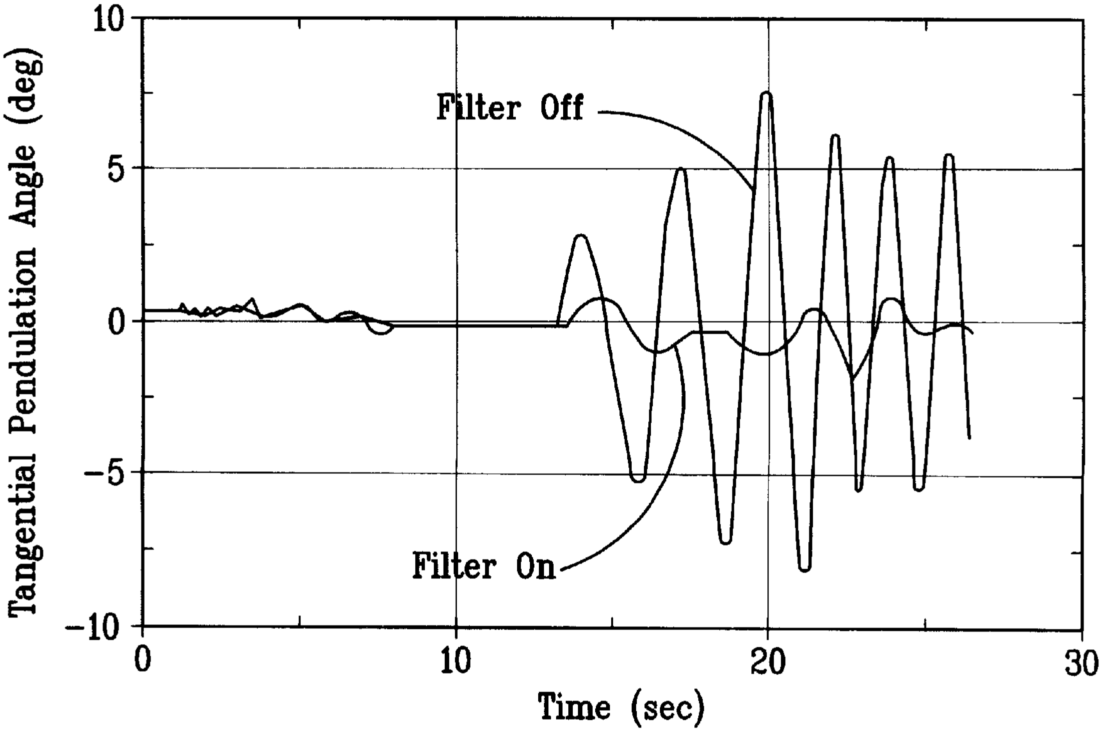
FIG. 9 depicts measured tangential pendulation $\theta_1$ for filtered and unfiltered maneuvers in a testbed experiment of the present invention.

Parker'99 described experimental verification, using 3 independently controlled DC servo motors to actuate the crane's degrees of freedom. A typical 3-axis coordinated maneuver was generated using operator joysticks. The crane's luff, slew, and hoist motion were recorded by joint encoders and are shown in FIGS. 5, 6, and 7. FIGS. 8 and 9 show the resulting tangential pendulation and radial pendulation for the scaled experiment. The residual pendulation reduction resulting from use of the command shaping filter is approximately 18 dB.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A control system for filtering input commands to a rotary boom crane to reduce payload pendulation, wherein the rotary boom crane comprises a crane column horizontally rotatable about a vertical axis, a luffing boom mounted with the crane column, a variable-length hoist-line attached to the distal end of the luffing boom, and an operator input device for the input commands, wherein a payload suspended from the hoist-line is moveable in a horizontal and a vertical plane responsive to the operator input device, the payload having a tangential pendulation and a radial pendulation, wherein the control system comprises:

a) an input command sensor, responsive to the input commands from the operator input device, the input commands comprising a commanded hoist velocity $\dot{L}_c$, a commanded luff velocity $\dot{\beta}_c$, and a commanded slew velocity $\dot{\alpha}_c$;

b) a pendulation frequency identifier, indicative of residual payload pendulation frequency of the rotary boom crane; and c) a command shaping filter, adapted to generate a plurality of filtered signals to reduce payload pendulation in the rotary boom crane by filtering out the residual payload pendulation frequency from the input commands.

2. The control system of claim 1, wherein the control system further comprises:

a) a plurality of velocity servo controllers, responsive to the plurality of filtered signals, the plurality of filtered signals comprising a filtered hoist velocity $\dot{L}$, a filtered luff velocity $\dot{\beta}$ and a filtered slew velocity $\dot{\alpha}$; and b) a plurality of motors, operationally connected and responsive to the plurality of velocity servo controllers to achieve the filtered hoist velocity, the filtered luff velocity, and the filtered slew velocity.

3. The control system of claim 2, wherein the tangential pendulation and the radial pendulation are determined by a plurality of nonlinear equations of motion, the plurality of equations being a function of hoist-line length $L_3$, gravity g, luff angle β, slew angle α, tangential rotation angle $\theta_1$, and a radial rotation angle $\theta_2$, wherein the command shaping filter is a function of the plurality of equations, and wherein a design for the command shaping filter comprises: a simplification of the nonlinear equations of motion and a reduction of the residual payload pendulation frequency.

4. The control system of claim 3, wherein the plurality of equations comprises a first equation having a form of:

$$\ddot{\theta}_1 + \frac{2\dot{L}_3}{L_3}\dot{\theta}_1 + 2\dot{\alpha}\dot{\theta}_2 + \left(-\dot{\alpha}^2 - \frac{L_2\sin(\beta)\dot{\beta}^2}{L_3} + \frac{L_2\cos(\beta)\ddot{\beta}}{L_3} + \frac{g}{L_3}\right)\theta_1 + \left(\ddot{\alpha} + \frac{2\dot{\alpha}\dot{L}_3}{L_3}\right)\theta_2 = \frac{-L_2\cos(\beta)\ddot{\alpha}}{L_3} + \frac{2L_2\sin(\beta)\dot{\alpha}\dot{\beta}}{L_3};$$

and a second equation having a form of:

$$\ddot{\theta}_2 + \frac{2\dot{L}_3}{L_3}\dot{\theta}_2 - 2\dot{\alpha}\dot{\theta}_1 + \left(-\dot{\alpha}^2 - \frac{L_2\sin(\beta)\dot{\beta}^2}{L_3} + \frac{L_2\cos(\beta)\ddot{\beta}}{L_3} + \frac{g}{L_3}\right)\theta_2 + \left(-\ddot{\alpha} - \frac{2\dot{\alpha}\dot{L}_3}{L_3}\right)\theta_1 = \frac{L_2\cos(\beta)\dot{\alpha}^2}{L_3} + \frac{L_2\cos(\beta)\dot{\beta}^2}{L_3} + \frac{L_2\sin(\beta)\ddot{\beta}}{L_3},$$

where $L_3$ is the hoist-line length, g is gravity, β is the luff angle, α is the slew angle, $\theta_1$ is the tangential rotation angle, and $\theta_2$ is the radial rotation angle.

5. The control system of claim 3, wherein the plurality of equations have a form of:

$$\begin{bmatrix} 1 & 0 \\ 0 & 1 \end{bmatrix}\begin{bmatrix} \ddot{\theta}_1 \\ \ddot{\theta}_2 \end{bmatrix} + \begin{bmatrix} \frac{g}{L_3} & 0 \\ 0 & \frac{g}{L_3} \end{bmatrix}\begin{bmatrix} \theta_1 \\ \theta_2 \end{bmatrix} = \begin{bmatrix} \frac{-\cos(\beta)L_2\ddot{\alpha}}{L_3} \\ \frac{L_2\ddot{\beta}\sin(\beta)}{L_3} \end{bmatrix},$$

where $L_3$ is the hoist-line length, g is gravity, β is the luff angle, α is the slew angle, $\theta_1$ is the tangential rotation angle, and $\theta_2$ is the radial rotation angle.

6. The control system of claim 4, wherein the command shaping filter comprises a first filter for slew angular velocity $\dot{\alpha}$ and a second filter for luff velocity $\dot{\beta}$.

7. The control system of claim 6, wherein the first filter and the second filter are a function of the hoist-line length $L_3$ and gravity g.

8. The control system of claim 7, wherein:

the first filter is defined by a Laplace-domain quantity having a form of:

$$\ddot{\alpha}_{Filtered}(s) = \frac{a^3(g + L_3 s^2)}{g(a+s)^3}\ddot{\alpha}_{Commanded}(s);$$

and the second filter is defined by a Laplace-domain quantity having a form of:

$$\ddot{\beta}_{Filtered}(s) = \frac{a^3(g + L_3 s^2)}{g(a+s)^3}\ddot{\beta}_{Commanded}(s),$$

wherein a is a design parameter, $L_3$ is the hoist-line length, g is gravity, β is the luff angle, and α is the slew angle.

9. The control system of claim 8, wherein the first filter and the second filter are adapted to yield unity steady-state gain.

10. The control system of claim 8, wherein the design parameter a varies in time and is a function of hoist-line length $L_3$.

11. The control system of claim 1, wherein the command shaping filter between a commanded input and a crane input has the form of:

$$U_i(s) = \frac{a^3(s^2 + \omega_i^2)}{(\omega_i^2(s+a))^3}U_i^c(s),$$

wherein $U_i^c$ denotes the commanded input, s denotes a Laplace transformation variable, $U_i$ denotes the crane input, $\omega_i$ denotes a filter frequency, and a denotes a design parameter.

12. The control system of claim 11, where the command shaping filter is a notch filter.

13. The control system of claim 11, wherein $L_3$ denotes lift-line length, α denotes slew acceleration command, β denotes luff acceleration command, g denotes gravity constant, s denotes a Laplace transformation variable, and a denotes a design parameter, wherein the plurality of filtered signals are related to the input commands according to a first filter having a form of:

$$\ddot{\alpha}_{Filtered}(s) = \frac{a^3(g + L_3 s^2)}{(g(a+s))^3}\ddot{\alpha}_{Commanded}(s);$$

and a second filter having a form of:

$$\ddot{\beta}_{Filtered}(s) = \frac{a^3(g + L_3 s^2)}{(g(a+s))^3}\ddot{\beta}_{Commanded}(s),$$

wherein a is a design parameter, $L_3$ is the hoist-line length, g is gravity, β is the luff angle, and α is the slew angle.

14. A control system for filtering operator commands to a rotary boom crane to reduce payload pendulation, wherein the rotary boom crane comprises an operator input device for the operator commands, a crane column horizontally rotatable about a vertical axis, a luffing boom mounted with the crane column, a variable-length hoist-line attached to the distal end of the luffing boom, a payload suspended from the hoist-line, the payload moveable in a horizontal and a vertical plane responsive to the operator input device, the payload having a tangential pendulation and a radial pendulation, wherein the tangential pendulation and the radial pendulation are determined by a plurality of equations of motion, wherein the control system comprises:

a) an input command sensor, responsive to the operator commands from the operator input device, the operator commands comprising a commanded hoist velocity $\dot{L}_c$, a commanded luff velocity $\dot{\beta}_c$, and a commanded slew velocity $\dot{\alpha}_c$;

b) a pendulation frequency identifier, indicative of residual payload pendulation frequency of the rotary boom crane;

c) a command shaping filter, adapted to generate a plurality of filtered commands by filtering out the residual payload pendulation frequency from the operator commands, wherein the command shaping filter is a function of the plurality of equations, wherein the command shaping filter has the form of:

$$U_i(s) = \frac{a^3(s^2 + \omega_i^2)}{(\omega_i^2(s+a))^3}U_i^c(s),$$

wherein $U_i^c$ denotes the commanded input, s denotes a Laplace transformation variable, $U_i$ denotes crane input, $\omega_i$ denotes a filter frequency, and a denotes a design parameter; wherein the plurality of filtered commands are related to the operator commands according to a first filter having a form of:

$$\ddot{\alpha}_{Filtered}(s) = \frac{a^3(g + L_3 s^2)}{g(a+s)^3}\ddot{\alpha}_{Commanded}(s)$$

and a second filter having a form of:

$$\ddot{\beta}_{Filtered}(s) = \frac{a^3(g + L_3 s^2)}{(g(a+s))^3}\ddot{\beta}_{Commanded}(s),$$

wherein $L_3$ denotes hoist-line length, α denotes slew acceleration command, β denotes luff acceleration command, g denotes gravity constant, s denotes a Laplace transformation variable, and a denotes a design parameter;

d) a plurality of crane servo controllers, responsive to the plurality of filtered commands, the plurality of filtered commands comprising a filtered hoist velocity $\dot{L}$, a filtered luff velocity $\dot{\beta}$ and a filtered slew velocity $\dot{\alpha}$; and e) a plurality of motors, operationally connected and responsive to the plurality of crane servo controllers to achieve the filtered hoist velocity, the filtered luff velocity, and the filtered slew velocity.

15. A computer-implemented method for filtering payload pendulation frequency to reduce payload pendulation, wherein the rotary boom crane comprises a crane column horizontally rotatable about a vertical axis, a luffing boom mounted with the crane column, and a variable-length hoist-line attached to the distal end of the luffing boom, a payload suspended from the hoist-line, the payload moveable in a horizontal and a vertical plane responsive to an input device, the payload having a tangential rotation $\theta_1(t)$, and a radial rotation $\theta_2(t)$, the method comprising the steps of:

a) representing the dynamics of the rotary crane with a plurality of equations of nonlinear equations of motion, the plurality of equations being a function of lift-line length $L_3$, gravity g, vertical column rotation angle α, boom elevation angle β, radial rotation angle $\theta_2$, and tangential rotation angle $\theta_1$;

b) receiving input signals from at least one input device;

c) filtering the input signals to produce filtered signals, such that payload pendulation associated with movement of the rotary boom crane is reduced from the unfiltered state, wherein the step of filtering is according to a command shaping filter defined by the steps comprising:

i) linearizing the plurality of equations with respect to the tangential rotation angle $\theta_1$ and the radial rotation angle $\theta_2$, the linearized plurality of equations having the form:

$$\begin{bmatrix} 1 & 0 \\ 0 & 1 \end{bmatrix}\begin{bmatrix} \ddot{\theta}_1 \\ \ddot{\theta}_2 \end{bmatrix} + \begin{bmatrix} \frac{g}{L_3} & 0 \\ 0 & \frac{g}{L_3} \end{bmatrix}\begin{bmatrix} \theta_1 \\ \theta_2 \end{bmatrix} = \begin{bmatrix} \frac{-\cos(\beta)L_2\ddot{\alpha}}{L_3} \\ \frac{L_2\ddot{\beta}\sin(\beta)}{L_3} \end{bmatrix},$$

where L is the lift-line length, g is gravity, β is the luff angle, and α is the slew angle.

ii) transforming the linearized plurality of equations into decoupled modal coordinates;

iii) designing a command shaping filter between a commanded input and a crane input according to:

$$U_i(s) = \frac{a^3(s^2+\omega_i^2)}{(\omega_i^2(s+a))^3}U_i^c(s),$$

wherein $U_i^c$ denotes the commanded input, s denotes a Laplace transformation variable, $U_i$ denotes crane input, $\omega_i$ denotes a filter frequency, and a denotes a design parameter;

iv) transforming the filter to crane input to obtain a first filter having a form of:

$$\ddot{\alpha}_{Filtered}(s) = \frac{a^3(g+Ls^2)}{g(a+s)^3}\ddot{\alpha}_{Commanded}(s);$$

and a second filter having a form of:

$$\ddot{\beta}_{Filtered}(s) = \frac{a^3(g+Ls^2)}{g(a+s)^3}\ddot{\beta}_{Commanded}(s),$$

wherein a is a design parameter, $L_3$ is the hoist-line length, g is gravity, β is the luff angle, and α is the slew angle; and d) transmitting the filtered signals to a crane servo controller.

16. A command shaping method to reduce payload pendulation in a rotary boom crane, where the rotary boom crane comprises an input device for input commands, a crane column horizontally rotatable about a vertical axis, a luffing boom mounted with the crane column, a variable-length hoist-line attached to the luffing boom, and crane servo controllers, the command shaping method being characterized by a payload tangential pendulation and a payload radial pendulation, wherein the command shaping method comprises:

a) accepting a plurality of input commands from the input device, the input commands comprising a hoist velocity $\dot{L}$, a luff velocity $\dot{\beta}$, and a slew angular velocity $\dot{\alpha}$;

b) identifying a pendulation frequency, indicative of residual payload pendulation frequency;

c) filtering the input commands to remove the residual payload pendulation frequency to reduce payload pendulation in the rotary boom crane; and d) transmitting the filtered signals to the crane servo controllers.

17. The command shaping method of claim 16, wherein the payload tangential pendulation and the payload radial pendulation are determined by a plurality of equations of motion, the plurality of equations being a function of hoist-line length $L_3$, gravity g, luff angle β, slew angle α, tangential rotation angle $\theta_1$, and a radial rotation angle $\theta_2$, wherein the plurality of equations comprises a first equation having a form of:

$$\ddot{\theta}_1 + \frac{2\dot{L}_3}{L_3}\dot{\theta}_1 + 2\dot{\alpha}\dot{\theta}_2 + \left(-\dot{\alpha}^2 - \frac{L_2\sin(\beta)\dot{\beta}^2}{L_3} + \frac{L_2\cos(\beta)\ddot{\beta}}{L_3} + \frac{g}{L_3}\right)\theta_1 + \left(\ddot{\alpha} + \frac{2\dot{\alpha}\dot{L}_3}{L_3}\right)\theta_2 = \frac{-L_2\cos(\beta)\ddot{\alpha}}{L_3} + \frac{2L_2\sin(\beta)\dot{\alpha}\dot{\beta}}{L_3};$$

and a second equation having a form of:

$$\ddot{\theta}_2 + \frac{2\dot{L}_3}{L_3}\dot{\theta}_2 + 2\dot{\alpha}\dot{\theta}_1 + \left(-\dot{\alpha}^2 - \frac{L_2\sin(\beta)\dot{\beta}^2}{L_3} + \frac{L_2\cos(\beta)\ddot{\beta}}{L_3} + \frac{g}{L_3}\right)\theta_2 + \left(-\ddot{\alpha} - \frac{2\dot{\alpha}\dot{L}_3}{L_3}\right)\theta_1 = \frac{L_2\cos(\beta)\dot{\alpha}^2}{L_3} + \frac{L_2\cos(\beta)\dot{\beta}^2}{L_3} + \frac{L_2\sin(\beta)\ddot{\beta}}{L_3},$$

where $L_3$ is the hoist-line length, g is gravity, β is the luff angle, α is the slew angle, $\theta_1$ is the tangential rotation angle, and $\theta_2$ is the radial rotation angle.

18. The command shaping method of claim 16, wherein the payload tangential pendulation and the payload radial pendulation are determined by a plurality of equations of motion, the plurality of equations being a function of hoist-line length $L_3$, gravity g, luff angle β, slew angle α, tangential rotation angle $\theta_1$, and a radial rotation angle $\theta_2$, wherein the plurality of equations have a form of:

$$\begin{bmatrix} 1 & 0 \\ 0 & 1 \end{bmatrix}\begin{bmatrix} \ddot{\theta}_1 \\ \ddot{\theta}_2 \end{bmatrix} + \begin{bmatrix} \frac{g}{L_3} & 0 \\ 0 & \frac{g}{L_3} \end{bmatrix}\begin{bmatrix} \theta_1 \\ \theta_2 \end{bmatrix} = \begin{bmatrix} \frac{-\cos(\beta)L_2\ddot{\alpha}}{L_3} \\ \frac{L_2\ddot{\beta}\sin(\beta)}{L_3} \end{bmatrix},$$

where $L_3$ is the hoist-line length, g is gravity, β is the luff angle, α is the slew angle, $\theta_1$ is the tangential rotation angle, and $\theta_2$ is the radial rotation angle.

19. The command shaping method of claim 18, wherein there is a relationship of input commands to filtered signals, wherein the filter is given according to a transform between a commanded input and a crane input according to:

$$U_i(s) = \frac{a^3(s^2+\omega_i^2)}{\omega_i^2(s+a)^3}U_i^c(s),$$

wherein $U_i^c$ denotes the commanded input, s denotes a Laplace transformation variable, $U_i$ denotes the crane input, $\omega_1$ denotes a filter frequency, and a denotes a predetermined design parameter.

20. The command shaping method of claim 19, wherein the pendulation frequency $\omega_i$ changes according to changes in hoist-line length $L_3$, according to:

$$\omega_i = \sqrt{\frac{g}{L_3}},$$

where g is gravity.

21. The command shaping method of claim 16, additionally comprising translating input commands into filtered commands for implementation.

22. The command shaping method of claim 21, wherein $L_3$ denotes hoist-line length, $\alpha$ denotes slew acceleration command, $\beta$ denotes luff acceleration command, g denotes gravity constant, s denotes a Laplace transformation variable, and a denotes a design parameter, wherein a plurality of filtered commands filtered by the command shaping filter are related to the input commands according to a first filter having a form of:

$$\ddot{\alpha}_{Filtered}(s) = \frac{a^3(g + Ls^2)}{g(a+s)^3}\ddot{\alpha}_{Commanded}(s);$$

and a second filter having a form of:

$$\ddot{\beta}_{Filtered}(s) = \frac{a^3(g + Ls^2)}{g(a+s)^3}\ddot{\beta}_{Commanded}(s),$$

wherein a is a design parameter, $L_3$ is the hoist-line length, g is gravity, $\beta$ is the luff angle, and $\alpha$ is the slew angle.

* * * * *